United States Patent [19]

Gasparrini

[11] 4,102,255
[45] Jul. 25, 1978

[54] HIGH PRESSURE HOUSEHOLD COFFEE MACHINE

[76] Inventor: Luigi Gasparrini, Via Timavo, 22, Rome, Italy

[21] Appl. No.: 678,283

[22] Filed: Apr. 19, 1976

[51] Int. Cl.² ............................................. A47J 31/24
[52] U.S. Cl. ........................................ 99/303; 99/287
[58] Field of Search .......... 99/287, 281, 295, 299–300, 99/302 R, 304, 321, 303

[56] References Cited

U.S. PATENT DOCUMENTS

| 2,688,911 | 9/1954 | Hochmayr | 99/302 R |
| 3,218,956 | 11/1965 | Monticelli | 99/302 R |
| 3,266,410 | 8/1966 | Novi et al. | 99/287 |
| 3,361,052 | 1/1968 | Weber | 99/302 R X |

FOREIGN PATENT DOCUMENTS

| 733,527 | 7/1955 | United Kingdom | 99/287 |

*Primary Examiner*—Harvey C. Hornsby
*Assistant Examiner*—Arthur O. Henderson
*Attorney, Agent, or Firm*—Guido Modiano; Albert Josif

[57] ABSTRACT

There is disclosed a machine for preparing so called "espresso" coffee which is particularly suitable for household use. The machine comprises a water container for heating a quantity of water which is then caused to pass under high pressure through a layer of powdered coffee arranged in a percolating chamber. Before reaching the percolating chamber the hot water passes through a coiled tube which is immersed in a cooling fluid separated from the hot water, thus causing a controlled cooling of the hot water passing in the coiled tube. Between the container for the water to be heated and the chamber in which the cooling fluid is arranged there is provided a partition wall having the purpose of limiting heat transfer between the water container and the cooling chamber.

6 Claims, 1 Drawing Figure

HIGH PRESSURE HOUSEHOLD COFFEE MACHINE

BACKGROUND OF THE INVENTION

This invention relates to a machine for preparing "espresso" coffee, particularly for use as a home appliance, of the type having a container for the water to be heated in order to form the beverage upon percolation under pressure through a layer of powdered coffee, and a percolation chamber connected to the water container through an interconnecting pipe, the pipe having one end submerged in the water container and another end opening into the percolation chamber through a valve, and being arranged with a portion thereof within a cooling space or receptacle.

The prior art coffee preparing machines of this design suffer from the drawback of operating at pressure levels only slightly above the normal pressure level and of cooling the hot water for the beverage by the introduction of part of said hot water into the cooling space, thereby the cooling step is effected at 100° C by evaporation, i.e. in a condition where the produced coffee beverage develops a "burned" taste which is quite unpleasant. However, it is generally agreed that the best coffee is prepared with the "espresso" high pressure machines operated by coffee-bars and the like, whereby optimum temperature and pressure conditions are reached and maintained which amount, according to tests purposely carried out, to 89°-92° C and about 7 to 9 kg/cm$^2$ gauge pressure, respectively. Such coffee preparing machines, sometimes of reduced overall size for household use, are, however, rather complex since they include mechanical systems, such as pumps, etc. effective to increase the pressure level.

It is a primary object of this invention to obviate the difficulties mentioned above and to provide a coffee preparing machine particularly suited to household use, wherein the hot water for percolation may be obtained at temperature levels approaching the water boiling point (100° C) and at high pressure.

SUMMARY OF THE INVENTION

This object is achieved by a coffee preparing machine of the aforementioned type, characterized in that the cooling space is located above the water container and contains a cooling fluid separated from the water in the water container, a partition wall effective to limit the heat transfer rate being provided between the cooling space and water container.

The above described arrangement ensures the basic advantage of subtracting only a minor amount of heat from the water container, thereby the water in the water container may be raised to a temperature of approximately 180° C and pressure of about 8-9 kg/cm$^2$, while no steam or vapor formation takes place in the cooling space, thereby the cooling fluid in that space is at the required temperature for cooling the percolation water down to the correct temperature level.

BRIEF DESCRIPTION OF THE DRAWING

Further features of the invention will become apparent from the ensuing description of a preferred, though not exclusive, embodiment thereof, illustrated by way of example and not of limitation in the accompanying drawing, which shows a vertical and longitudinal sectional view of a coffee preparing machine in a preferred embodiment thereof.

DESCRIPTION OF A PREFERRED EMBODIMENT

Figure 1:
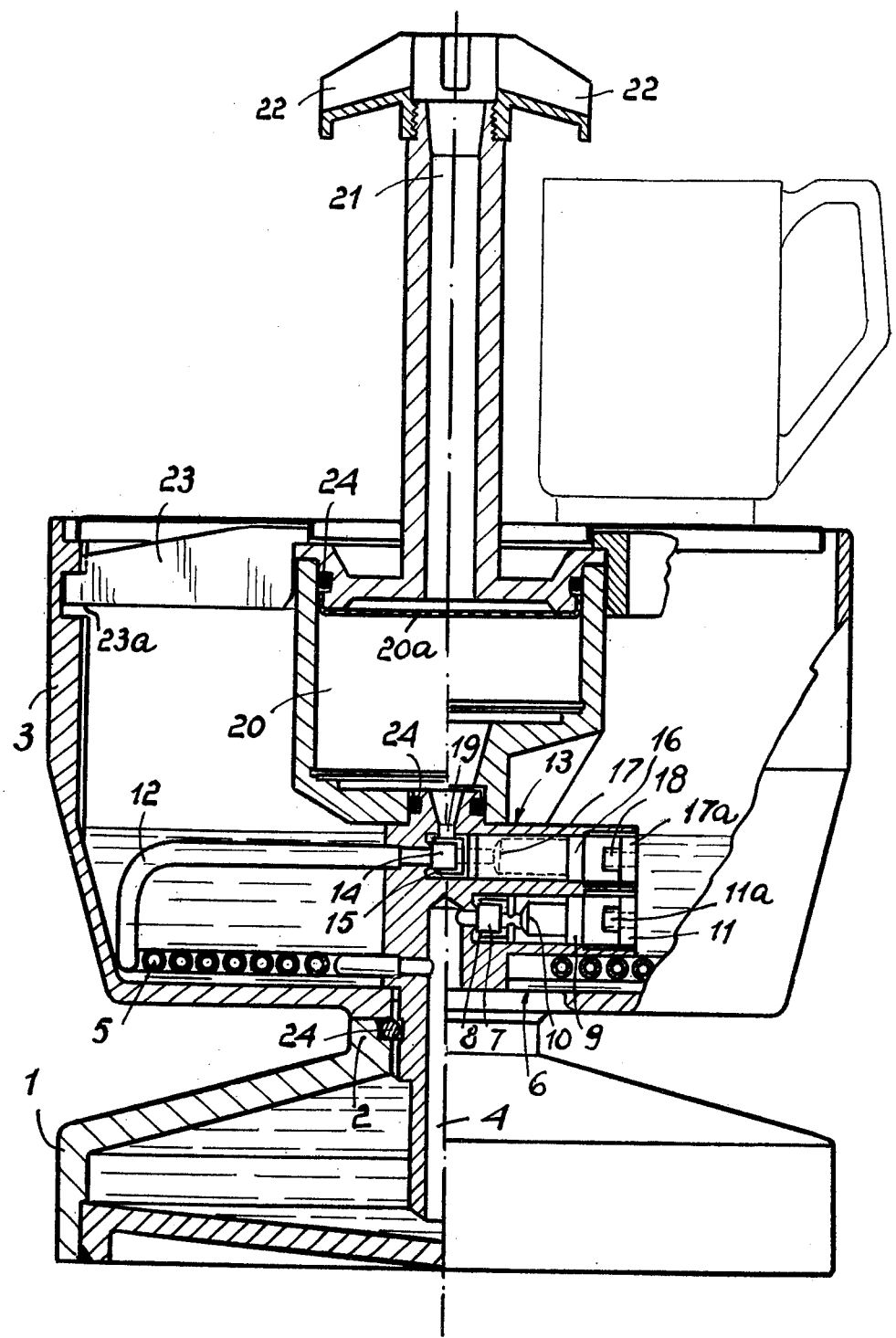

With reference to the drawing, the instant coffee preparing machine comprises a water container 1 arranged below an upper container 3, defining a cooling space and containing a cooling fluid separated from the water in the water container 1, between the two containers there being provided a narrow neck portion 2. A vertical conduit 4 starting from the inside of the lower container 1 enters the upper container 3 to end in a spiralled tube 5 arranged horizontally. A safety valve 6 is arranged inside of the container 3 at the upper end of conduit 4; said valve comprises a shutter element 7, a seat 8 for the shutter element, a plunger 9 and related rod 10, and an adjustment body 11 for adjusting a bias spring 11a. A conduit, identified with the numeral 12, extends from the outer coil of the tube 5, and ends at a second valve 13 including a shutter element 14, a seat 15, a plunger 16 and related rod 17; in order to adjust the shutter element 14 to open at a predetermined pressure level, a spring 18 is provided whereagainst a threaded plug 17a abuts which is formed externally with a conventional cut for the insertion of a screwdriver tip.

A conduit 19 is arranged at the outlet of valve 13 providing communication between the tube 5 and the filter carrier 20 in which the powered coffee (not shown) is arranged in known manner. Thus, tube 5 and conduit 12 define an interconnecting pipe leading from the lower container 1 through conduit 19 into the percolation chamber defined by filter carrier 20. It is a significant feature of the invention to make the filter carrier 20, defining the percolation chamber, available in two interchangeable sizes, to allow for a different number of cups of coffee to be prepared, the left-hand portion of the drawing showing the larger size chamber, whereas the right-hand portion thereof shows the smaller size one.

At the filter carrier upper portion, there is provided a perforated metal diaphragm 20a which allows the passage of the percolated hot water but stops the coffee powder. A vertical delivery conduit 21 supported by the filter carrier 20 is located just above the diaphragm 20a and terminates at the top in a dispensing element comprising a number of delivery spouts 22. The conduit 21 is integral with a cover 23 which is applied to the upper container 3 through a bayonet type of locking engagement (see area 23a). Rubber gaskets 24 are suitably arranged between the conduit 4 and neck 2, conduit 19 and filter carrier 20, and between the filter carrier 20 and conduit 21, in order to provide a tight seal between the various machine sections.

The described machine operates as follows. Water is first introduced respectively into the lower container 1 and upper container 3. Actual tests showed that optimum results are to be obtained when the ratio of the water volumes in the containers 1 and 3 is about 2:1. Heat, such as supplied by a flame or through an electric resistance apparatus, either within or without the container 1, is applied to the water in said container, thus bringing it to boiling after a given time lapse. Thanks to the steam pressure thus raised, said water is forced through the vertical conduit 4 and then through the interconnecting pipe 5, 12 which, being submerged in water at a lower temperature than the container 3, is effective to establish a heat exchange condition and accordingly a relative reduction in the temperature of the water inside the pipe 5 down to levels suitable to permit the utilization of the coffee charge without burning it.

According to an inventive feature of the machine, it is both the amount of water provided and the shape and arrangement of the container 3, particularly as regards the interconnecting neck 2, which through being of a much reduced area with respect to the containers 1 and 3 creates in practice a zone of thermal resistance, that contribute toward maintaining said water at all times at a lower temperature than the temperature in the container 1. Another contributing factor is the flared configuration of the container 3 outer surface. In the meantime, an increasing pressure is created within the pipe 5 and 12 which acts upon the valve 13, suitably calibrated by means of the threaded plug 17a to open at optimum pressure levels in excess of 9 atm., thus allowing the water to flow through the outlet conduit 19 and then through the filter carrier 20. In the event of excess pressure, the relief valve 6, also suitably pre-calibrated, opens to discharge to the inside of the upper container 3.

The invention lends itself to numerous modifications and variations. Thus, for instance, by varying the number or diameter of the coils, or even the material wherefrom they are constructed, it becomes possible to vary the capacity and shape of the container 3 or container 1. It is also possible to provide a different locking means for the filter, and the latter may be permanently installed for a predetermined size, thereby a set of different size machines may be provided for various numbers of coffee drinks as desired. The constructional materials and the dimensions will be dictated by the operational requirements and the technological status.

In practicing the invention, it has been found that the machine just described is capable of issueing good quality "espresso" coffee thanks to the fact that optimum temperature and pressure conditions are observed, similar to the machines operated in coffee-bars but with a different process and far less bulk.

In lieu of the neck 2, it will be apparent that a dividing wall or partition may be provided occupying the full width of the containers 1 and 3, said partition being of a material featuring heat transfer limiting capabilities, and the containers 1 and 3 being in such a case more advantageously substantially cylindrical. It is further possible to provide the bottom wall of water container 1 with appropriate heating means.

It will be understood that during operation the cooling space containing the cooling liquid is at normal atmospheric pressure and therefore the cooling liquid will never overcome the temperature of 100° C.

I claim:

1. A machine for preparing "espresso" coffee, particularly for use as a home appliance, including a container for the water to be heated and intended to form the coffee drink, a percolation chamber above said water container and including a layer of powdered coffee through which the heated water is caused to percolate under pressure a delivery conduit connected to said percolation chamber to receive and direct said heated water to a container, a pipe extending between said percolation chamber and said water container having one end submerged in the water contained in said water container and another end opening into the bottom of said percolation chamber, a valve in communication with said pipe between said another end and said percolation chamber, and a cooling space surrounding a portion, of said pipe wherein said cooling space is located above said water container and contains a cooling fluid separated from the water in said water container, said cooling space and fluid providing a controlled cooling of said hot water passing in said pipe to cause activation of said coffee charge in said percolation chamber without burning same the machine further comprising a partition wall arranged between said cooling space and said water container for limiting the heat transfer therebetween.

2. A machine according to claim 1, comprising a neck between said water container and said cooling space.

3. A machine according to claim 1, wherein said cooling space is configurated to receive an amount of cooling fluid which is substantially twice as great as the amount of water present in said water container.

4. A machine according to claim 1, further comprising a safety valve between said pipe and said cooling space for putting into communication said water container with said cooling space in the event of excess pressure in said water container.

5. A machine according to claim 1, further comprising an interchangeable filter carrier for varying the number of coffee drinks to be delivered.

6. A machine according to claim 5, further comprising a delivery conduit arranged downstream of said filter carrier and having one end supported thereby, a dispensing element removably arranged at the other end of said delivery conduit and having a number of delivery spouts, said dispensing element being interchangeable according to the number of coffee drinks required.

* * * * *

UNITED STATES PATENT AND TRADEMARK OFFICE
CERTIFICATE OF CORRECTION

PATENT NO. : 4,102,255
DATED : July 25, 1978
INVENTOR(S) : Luigi Gasparrini

It is certified that error appears in the above-identified patent and that said Letters Patent are hereby corrected as shown below:

In the drawing -- Fig. 1 -- should be applied.

A second drawing sheet (Fig. 2) should appear as shown on the attached sheet.

Figure 2:
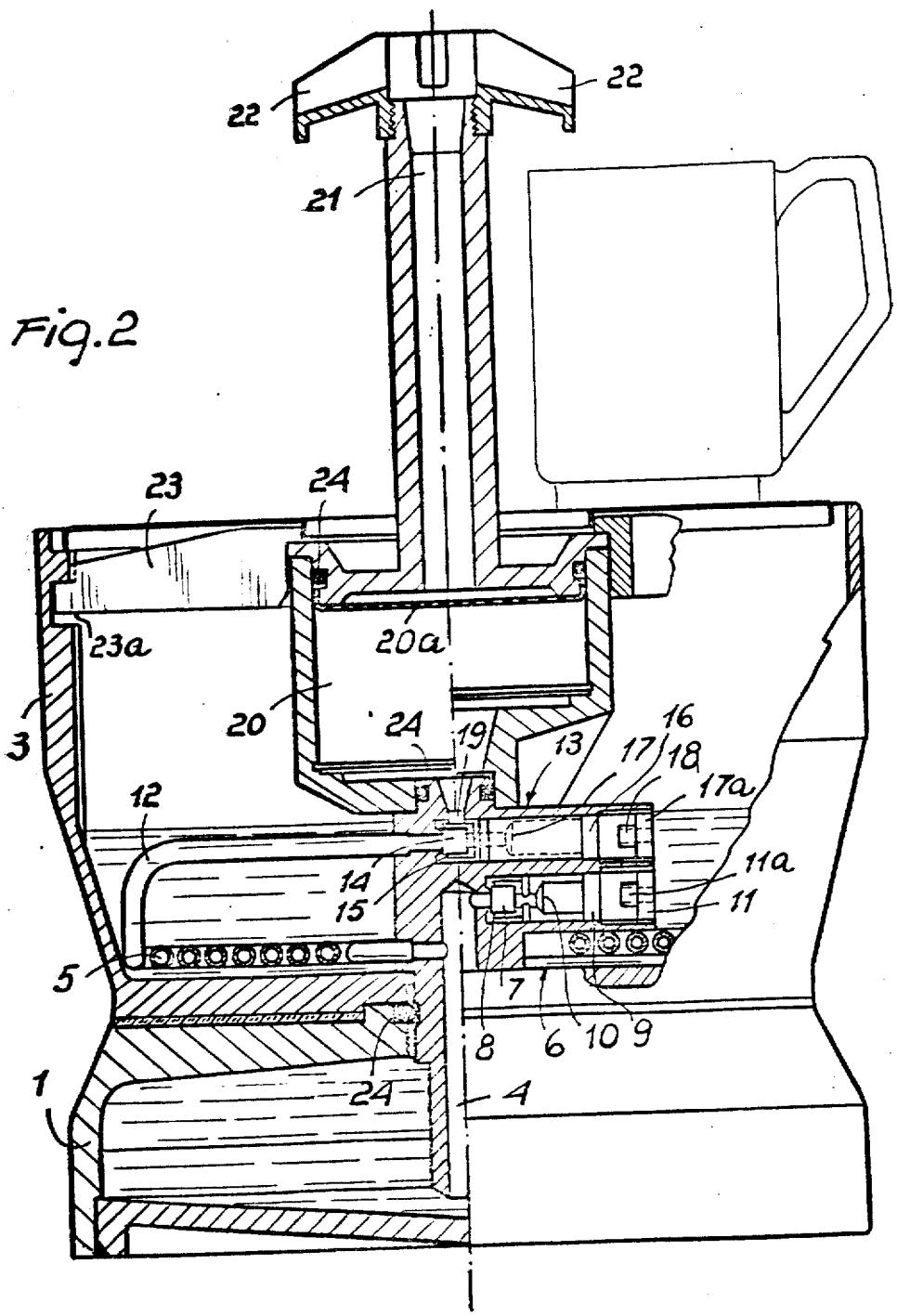

Column 1, line 63, cancel "a"; line 64, "embodiment" should read -- embodiments --; line 65, "in the" should read -- in Figs. 1 and 2 of the --; line 66, "drawing" should read -- drawings --; and "shows" should read -- show --; line 67, cancel "a"; line 68, "embodiment" should read -- embodiments --.

Column 2, line 9, after "portion 2" insert -- (Fig. 1) --.

Column 3, line 43, after "3" insert -- (Fig. 2) --.

Signed and Sealed this

Eighteenth Day of September 1979

[SEAL]

Attest:

Attesting Officer

LUTRELLE F. PARKER
Acting Commissioner of Patents and Trademarks